(12) United States Patent
Rothers

(10) Patent No.: US 11,073,135 B2
(45) Date of Patent: Jul. 27, 2021

(54) TENSIONED SUPPORT RING FOR WIND AND WATER TURBINES

(71) Applicant: James Kevin Rothers, Tucson, AZ (US)

(72) Inventor: James Kevin Rothers, Tucson, AZ (US)

(*) Notice: Subject to any disclaimer, the term of this patent is extended or adjusted under 35 U.S.C. 154(b) by 0 days.

(21) Appl. No.: 16/020,065

(22) Filed: Jun. 27, 2018

(65) Prior Publication Data

US 2020/0003183 A1 Jan. 2, 2020
US 2021/0172425 A9 Jun. 10, 2021

Related U.S. Application Data

(60) Provisional application No. 62/525,188, filed on Jun. 27, 2017.

(51) Int. Cl.
*F03D 1/00* (2006.01)
*F03D 5/02* (2006.01)
(Continued)

(52) U.S. Cl.
CPC ........... *F03D 13/20* (2016.05); *F03D 1/0608* (2013.01); *F03D 1/0691* (2013.01);
(Continued)

(58) Field of Classification Search
CPC ...... F03D 13/20; F03D 1/0691; F03D 1/0608; F03D 9/25; F03D 7/0224; F05B 2240/2211
(Continued)

(56) References Cited

U.S. PATENT DOCUMENTS 145,970 A 12/1873 Sanderson
243,169 A 6/1881 Sprague
(Continued)

FOREIGN PATENT DOCUMENTS

| DE | 102012009145 | 1/2012 | ............. F03D 11/04 |
| DE | 202011108484 | 1/2012 | ............. F03D 11/04 |
| WO | WO-2017212086 A1 * | 12/2017 | ............... F03D 1/06 |

OTHER PUBLICATIONS

Screen captures from YouTube video clip entitled "Double Tower Wind Ring", 6 pages, uploaded on Apr. 8, 2017 by user "Jimtheinventorguy". Retrieved from Internet: <https://www.youtube.com/watch?v=oJwcg0M9REE>.

(Continued)

*Primary Examiner* — Tulsidas C Patel
*Assistant Examiner* — S. Mikailoff
(74) *Attorney, Agent, or Firm* — Hayes Soloway P.C.

(57) ABSTRACT

It is a general object of the present invention to provide a new and less expensive method of creating a horizontal axis wind turbine for electrical power generation. This approach is based on a tensioned support ring in the shape of a regular polygon. This support ring is well suited to the construction of large wind turbines because it is very light, strong, and cost efficient to create. Also provided are two types of rotor supporting tower structures including a wheeled version for land use and another that floats on water. Additionally, a method of using the support ring to generate electrical power from underwater currents. Further provided is a rope drive method of transmitting energy from the support ring to a generator below. Finally, two methods of controlling blade pitch. Both methods have similar automatic feathering systems to protect against excessive rotational speeds.

4 Claims, 12 Drawing Sheets

(51) Int. Cl.
*F03D 15/00* (2016.01)
*F03D 13/20* (2016.01)
*F03D 1/06* (2006.01)
*F03D 7/02* (2006.01)
*F03D 9/25* (2016.01)

(52) U.S. Cl.
CPC ............ *F03D 7/0224* (2013.01); *F03D 9/25* (2016.05); *F05B 2240/2211* (2013.01)

(58) Field of Classification Search
USPC ......... 290/44, 55; 254/122, 124, 126; 269/3, 269/6, 95; 301/60, 61
See application file for complete search history.

(56) References Cited

U.S. PATENT DOCUMENTS

| | | | | |
|---|---|---|---|---|
| 548,171 | A * | 10/1895 | Atwood | B63H 21/28 416/169 R |
| 556,803 | A * | 3/1896 | Bramwell | 290/44 |
| 789,497 | A * | 5/1905 | Johnson | F03D 1/00 416/10 |
| 1,015,416 | A | 1/1912 | Bennett | |
| 1,183,219 | A * | 5/1916 | Manikowske | F03D 80/00 290/44 |
| 1,233,232 | A | 7/1917 | Heyroth | |
| 1,329,299 | A * | 1/1920 | Foster | F03D 7/0224 416/32 |
| 1,334,485 | A * | 3/1920 | Clipfell | F03D 7/0224 290/55 |
| 1,713,866 | A * | 5/1929 | D'Asseler | F03D 7/0224 416/196 R |
| 1,978,143 | A * | 10/1934 | Reimers | F03D 9/11 290/55 |
| 2,023,750 | A * | 12/1935 | Strandgren | B64C 11/006 416/108 |
| 2,107,690 | A * | 2/1938 | Clark | F03D 3/068 416/32 |
| 3,220,784 | A * | 11/1965 | Kilmer | B60B 27/023 384/545 |
| 3,428,376 | A * | 2/1969 | Zeller | B60B 27/023 384/544 |
| 3,942,839 | A * | 3/1976 | Chalk | B60B 1/0207 301/73 |
| 4,066,911 | A * | 1/1978 | Sarchet | F03D 7/0252 290/44 |
| 4,323,331 | A | 4/1982 | Schachle et al. | 416/9 |
| 4,330,714 | A | 5/1982 | Smith | 290/55 |
| 4,529,253 | A * | 7/1985 | Ho | B60B 1/0276 301/104 |
| 5,467,969 | A * | 11/1995 | Kobayashi | B60V 3/04 104/23.2 |
| 6,064,123 | A | 5/2000 | Gislason | 290/55 |
| 6,231,128 | B1 * | 5/2001 | Okajima | B60B 1/0223 301/104 |
| 7,215,038 | B2 | 5/2007 | Bacon | 290/55 |
| 7,255,527 | B2 * | 8/2007 | Hsu | F03D 15/00 415/4.3 |
| 7,927,065 | B2 * | 4/2011 | Moehring | F03D 1/0658 415/173.1 |
| 8,178,987 | B2 * | 5/2012 | Mahawili | H02K 7/1869 290/44 |
| 8,328,515 | B2 | 12/2012 | Dawoud et al. | 416/44 |
| 8,629,570 | B1 | 1/2014 | Kamenov | 290/44 |
| 8,801,363 | B2 * | 8/2014 | Williams | F03D 7/0248 415/4.3 |
| 2003/0122381 | A1 * | 7/2003 | Vann | F03D 1/0608 290/55 |
| 2003/0235493 | A1 * | 12/2003 | Keyvani | F03D 1/0608 415/4.1 |
| 2006/0177311 | A1 * | 8/2006 | Hsu | F03D 15/00 416/132 B |
| 2008/0253892 | A1 | 10/2008 | Dehlsen | 416/147 |
| 2009/0096217 | A1 * | 4/2009 | Watson | F03D 1/00 290/55 |
| 2011/0012363 | A1 * | 1/2011 | Finnell | F03D 1/0608 290/55 |
| 2012/0051914 | A1 | 3/2012 | Dehlsen et al. | 416/147 |
| 2012/0121418 | A1 * | 5/2012 | Williams | F03D 7/0248 416/170 R |
| 2015/0184895 | A1 * | 7/2015 | Shelef | H01L 31/0547 134/99.1 |
| 2019/0162167 | A1 * | 5/2019 | Gonzalez Perez | F03D 1/06 |

OTHER PUBLICATIONS

Screen captures from YouTube video clip entitled "Double Tower Wind Ring (Automatic blade feathering demonstration)", 6 pages, uploaded Apr. 24, 2017 by user "Jimtheinventorguy". Retrieved from Internet: <https://www.youtube.com/watch?v=6ChxF4z13dk>.
Screen captures from YouTube video clip entitled "Double Tower Wind Ring (barely breezy)", 6 pages, uploaded May 19, 2017 by user "Jimtheinventorguy". Retrieved from Internet: <https://www.youtube.com/watch?v=dH3-nyNdzgc>.

* cited by examiner

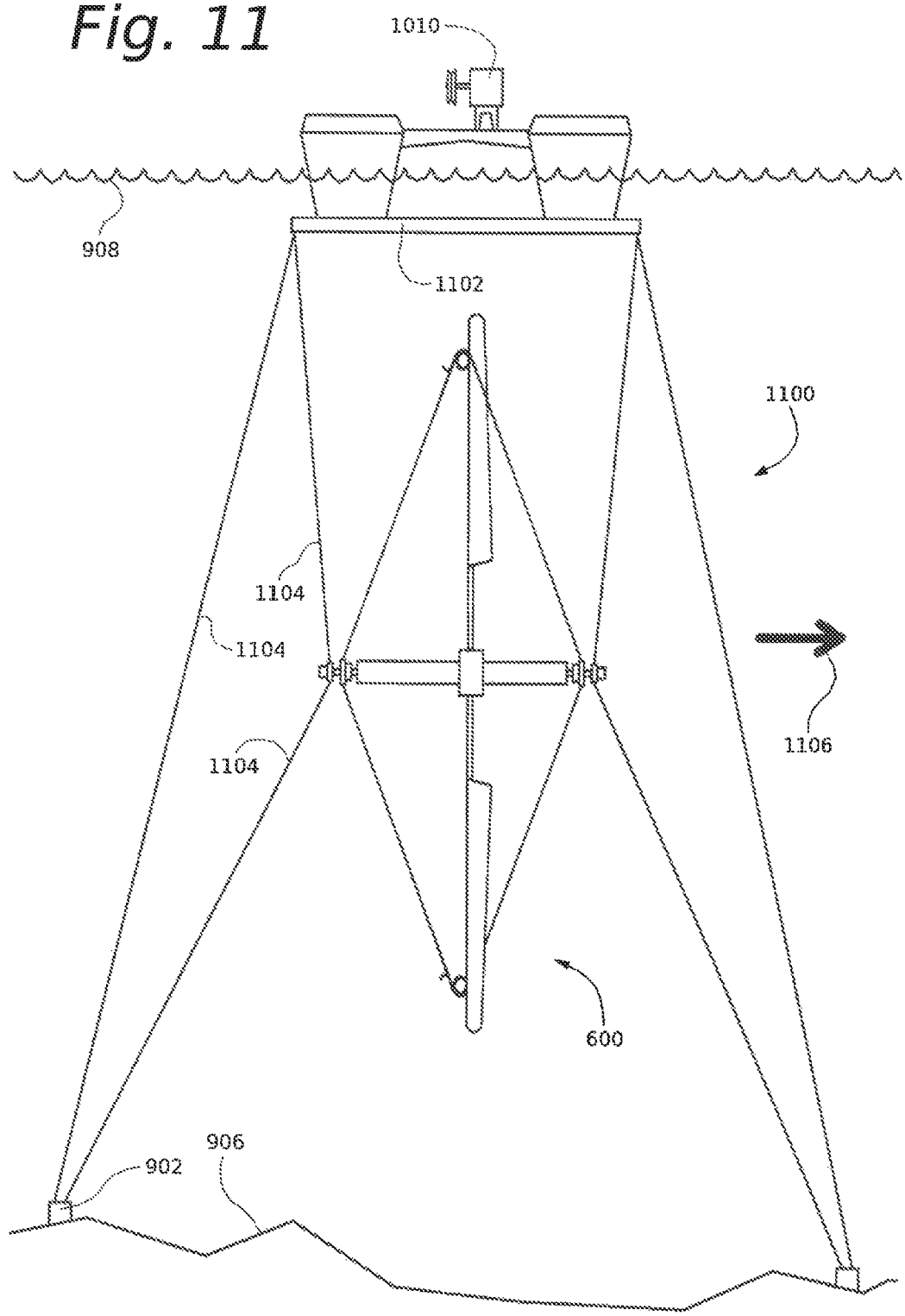

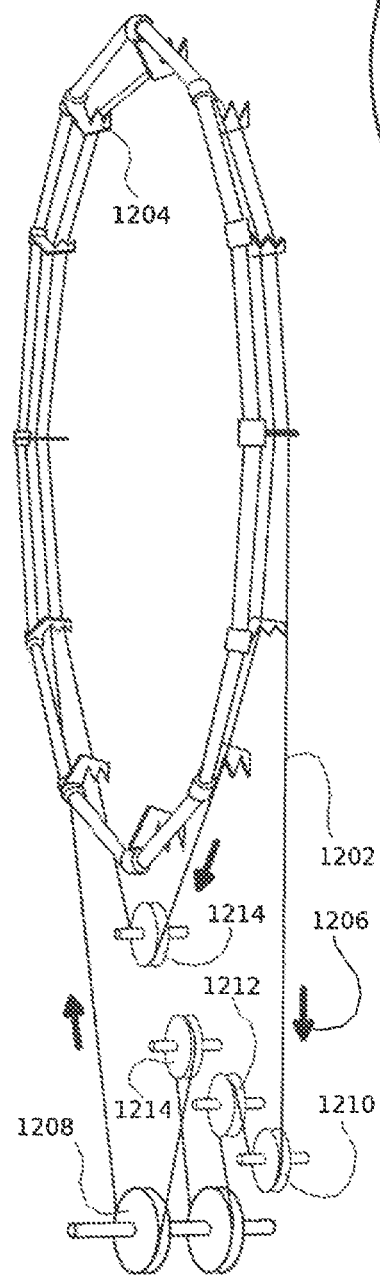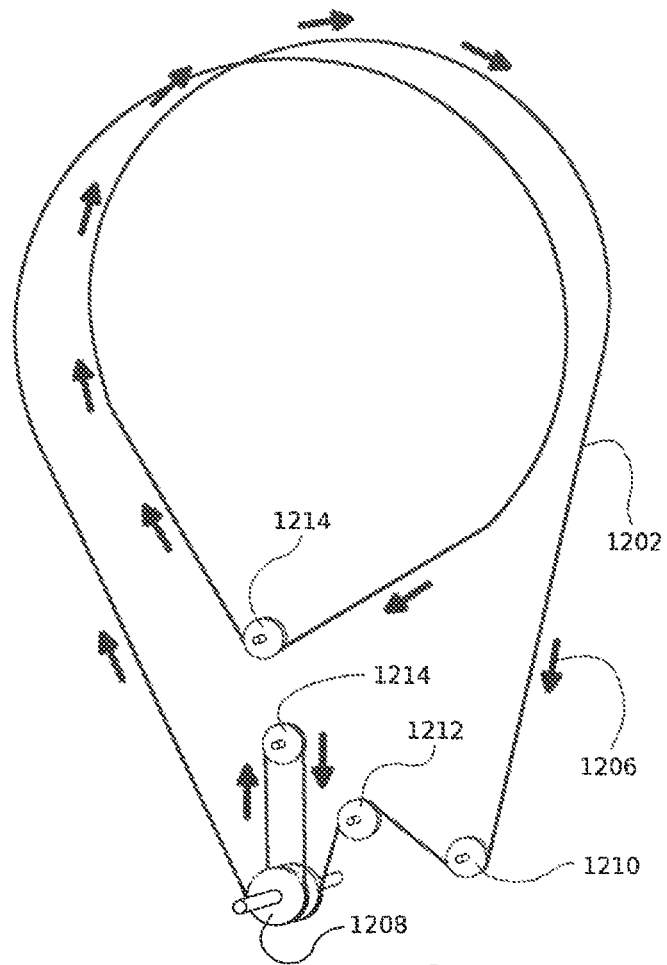
Fig. 12A
Fig. 12B

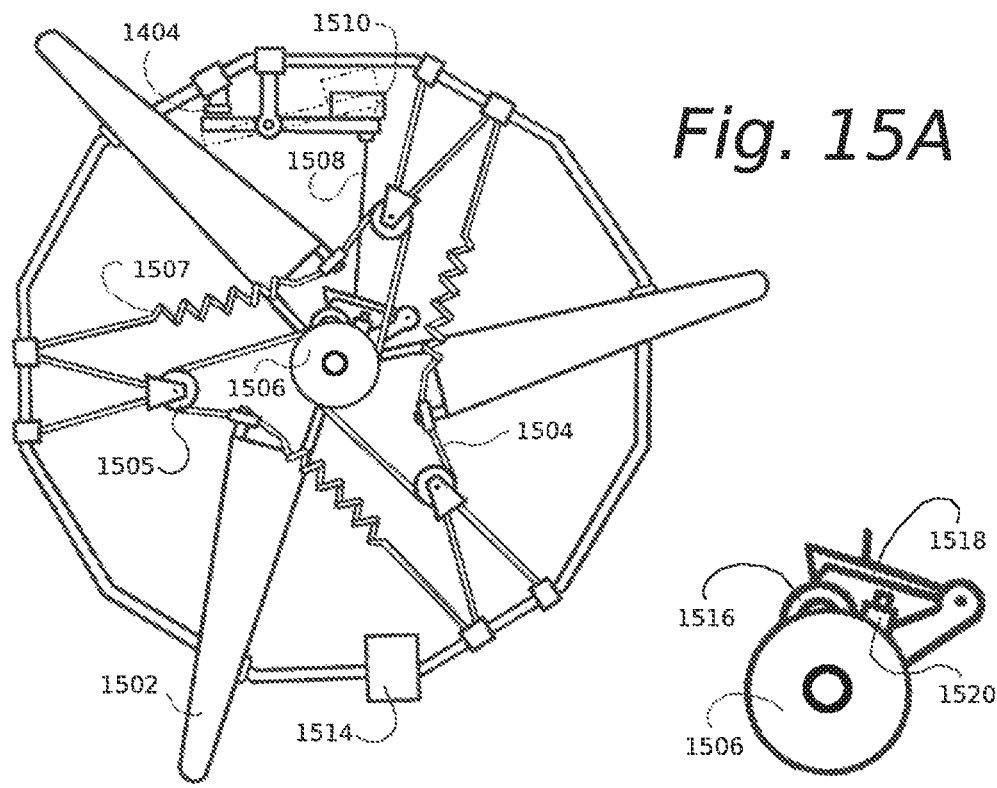
Fig. 15A
Fig. 15B
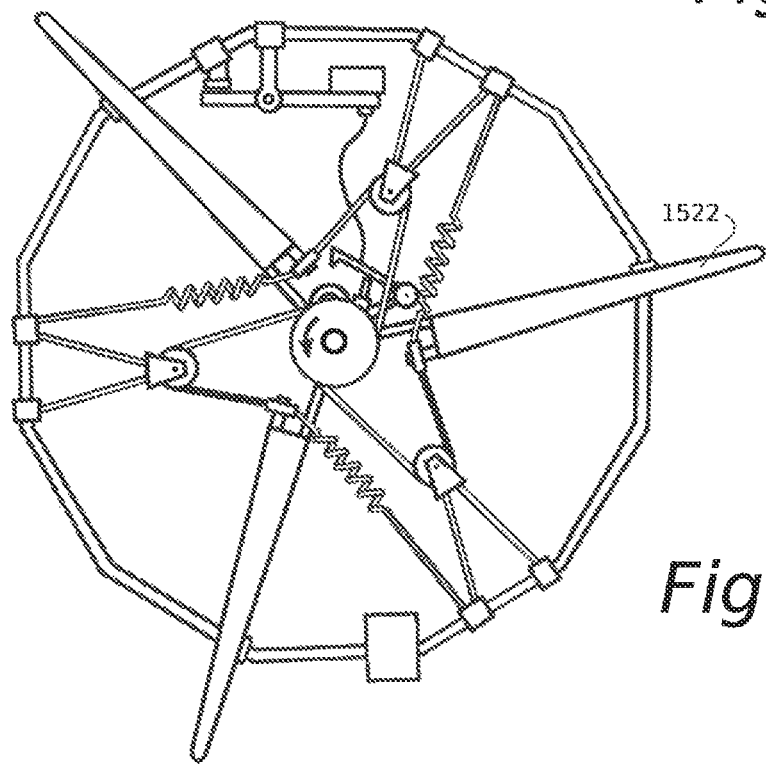
Fig. 15C

TENSIONED SUPPORT RING FOR WIND AND WATER TURBINES

CROSS-REFERENCE TO RELATED APPLICATIONS

This application claims the benefit of a provisional patent application No. 62/525,188, filed 2017 Jun. 27 by the present inventor.

BACKGROUND

Prior Art

The following is a tabulation of some prior art that presently appears relevant:

| Number | Issue Date | Patentee |
|---|---|---|
| 3,942,839 | Mar. 9, 1976 | Thomas O. Chalk |
| 4,330,714 | May 18, 1982 | Otto J. M. Smith |
| 6,064,123 | May 16, 2000 | Nils Erik Gislason |
| U.S. Pat. No. 8,629,570 B1 | Jan. 14, 2014 | Kamen George Kamenov |
| US 2008/0253892 A1 | Oct. 16, 2008 | James G. P. Dehlsen |
| DE202011108484U1 | | |
| DE102012009145A1 | | Klaus Hofmann |

Wind power provides an important source of carbon free power. But to obtain the maximum benefits, it's best to be very large. Large things tend to be expensive and there will always be a need for cost containment.

Currently the worlds largest wind turbine is the Vestas V-164 with a rotor diameter of 164 meters at a cost of around 9 million dollars.

The high price tag comes from certain obvious difficulties like hanging extremely large blades on a nacelle at the top of an extremely large tower. Plus there's a lot of expensive parts. Parts that keep the rotor facing into the wind. There needs to be a motor in each blade to enable pitch control. It requires a brake on the hub shaft to keep things under control during extreme conditions.

Also, there is a less obvious expense related to size. All 3 bladed turbines have similar speeds at the tips of the blades. This means that a small turbine will spin extremely fast which is very convenient when it comes to generating electricity.

But the opposite is true for very large turbines. As the diameter goes up, the turn speed goes down. This means that all the energy is concentrated into a very slow moving hub, which requires an extremely strong gear box to cope with the incredibly high torque involved.

US 2008/0253892 A1 by inventor James G. P. Dehlsen Pub. Date: Oct. 16, 2008 shows a tensioned ring support structure to help with the difficulties of attaching giant blades. But it doesn't do anything to alleviate a huge concentration of power at the hub shaft. In fact, it must add additional spokes for the purpose of transferring power there.

DE202011108484U1 brings the power to a generator located at ground level with a rope drive. But in the case of a very large turbine, it would need to be a very strong rope due to the incredibly high torque. As the size goes up, at some point, the weight of the rope alone would become a limiting factor.

U.S. Pat. No. 3,942,839 issued to Thomas O. Chalk on Mar. 9, 1976 shows a simplified way of making a tensioned support wheel that involves a giant ring with blades on the Inside and spokes that are simultaneously tensioned by spreading apart two sets of hubs.

U.S. Pat. No. 4,330,714 issued to Otto J. M. Smith on May 18, 1982 & U.S. Pat. No. 6,064,123 issued May 16, 2000 are two other examples of rotor assemblies comprised of large rings or wheels with blades on the inside. In at least two of these cases, the rotor is supported by a second tower. A second tower support has obvious structural benefits in the sense that you no longer have heavy parts with no support on one side of the hub.

Another advantage of this design is that it allows the electricity generating parts to be located at the base where these parts are more easily installed and maintained.

A less obvious advantage is that the power is being tapped near the blade tips. This is where movement is fast and forces are light. But even with these advantages, the regular sort of three bladed turbine seems to be dominating the market. Maybe wind wheels are uncommon because they don't scale up well. Maybe these designs are only practical if kept under a certain size that is well below the current recorded holding rotor diameter of 164 meters.

SUMMARY OF THE INVENTION

This invention involves a method of creating a turbine rotor that is based on a new type of tensioned support ring. This support ring is extremely strong, lightweight and inexpensive. By serving as a blade holder it can increase the size of the blades while decreasing the costs. This can be achieved because the blades no longer have extreme strength requirements. As a result, the blades could be made of smaller and lighter pieces that are assembled on site.

And while most commercially available wind turbines tap power at the slow moving hub, the tensioned support ring allows power to be tapped much closer to the fast moving blade tips. As a result, a much lighter gearbox can be used to create a spin rate required for efficient electricity production.

With a normal large scale wind turbine, there needs to be a motor in each blade to control blade pitch. Also, there needs to be a brake on the rotor to keep things under control during extreme wind conditions. But with the tensioned support ring, a single motor and a few simple parts can accomplish the same results at a significantly reduced cost.

BRIEF DESCRIPTION OF DRAWINGS

FIG. 11 is a sectional view of an underwater turbine generator system that uses a floating platform to provide an upward stabilizing force against anchored guy-wires.

FIG. 12A is a perspective view of a rope drive that can be used as an alternative to a belt belt drive. In this case, the rope is making two trips around the ring for added slip resistance.

FIG. 12B is an perspective view of the same rope drive system shown in FIG. 12A, but with the ring and hooks removed for visual clarity.

FIG. 15A is an elevation view of a tensioned ring with blades that are controlled by a motor.

FIG. 15B is a close up view of the motor area of FIG. 15A

FIG. 15C is the same view as FIG. 15A except the blades are now shown in a feathered position.

DRAWINGS

Reference Numerals

100 Support Ring
102 Elbow Connector
104 Spoke
106 Segment Bar
108 Expandable Hub Assembly
110 Hub Stiffener
112 Hub Plate
114 Hub Expansion Nut
116 Threaded Rod
202 Spoke Groove
400 Elbow with Eye Bolt
402 Spoke Connection Plate
404 Eye Bolt
406 Nut
502 Axle Stabilizing Spoke
504 Axle Positioning Plate
600 Wind Ring
602 Blade
604 Common Base
606 Front Tower
608 Back Tower
700 Wheeled Towers
702 Rotor Space
704 Tower A
706 Tower B
708 Wheel
710 Circular Track
712 Common Pin
714 Tower Connecting Cable
716 Slide Adjust Collar
800 Double Tower Frame
900 Floating Wind Turbine
901 Buoyant Material
904 Anchor Line
906 Sea Floor
908 Sea Surface
1000 Belt Driving Rotor System
1002 Belt Hook
1004 Belt
1006 Drive Pulley
1008 Belt Tensioner Pulley
1010 Generator
1012 Direction of Belt Travel
1100 Water Turbine Generator
1102 Floating Platform
1104 Guy-Wire
1106 Water Currents
1202 Spliced Rope
1204 Double Hook
1206 Direction of Rope Travel
1208 Generator Pulley
1210 Rope Tensioning Pulley
1212 Guide Pulley
1214 Groove Change Pulley
1300 Fast Entry Cam Cleat
1302 Cam Cleat Base
1304 Spoke Groove
1400 Rotor with Speed Limiting Governor
1402 Centrifugal Weight
1404 Adjustable Strength Catch
1406 Feathering Cable
1408 Power Return Spring
1410 Hinge connection
1412 Power Position
1414 Feathered Position
1500 Turbine Rotor with Motorized Pitch Control
1502 Blade in Power Positioning
1504 Power Cable
1505 Force Redirect Pulley
1506 Power Spool
1507 Feathering Spring
1508 Trip Wire
1510 Centrifugal Weight
1514 Counter Weight
1516 Power Motor
1518 Motor Lock
1520 Lock Release Solenoid

DETAILED DESCRIPTION OF DRAWINGS

Figure 1A:
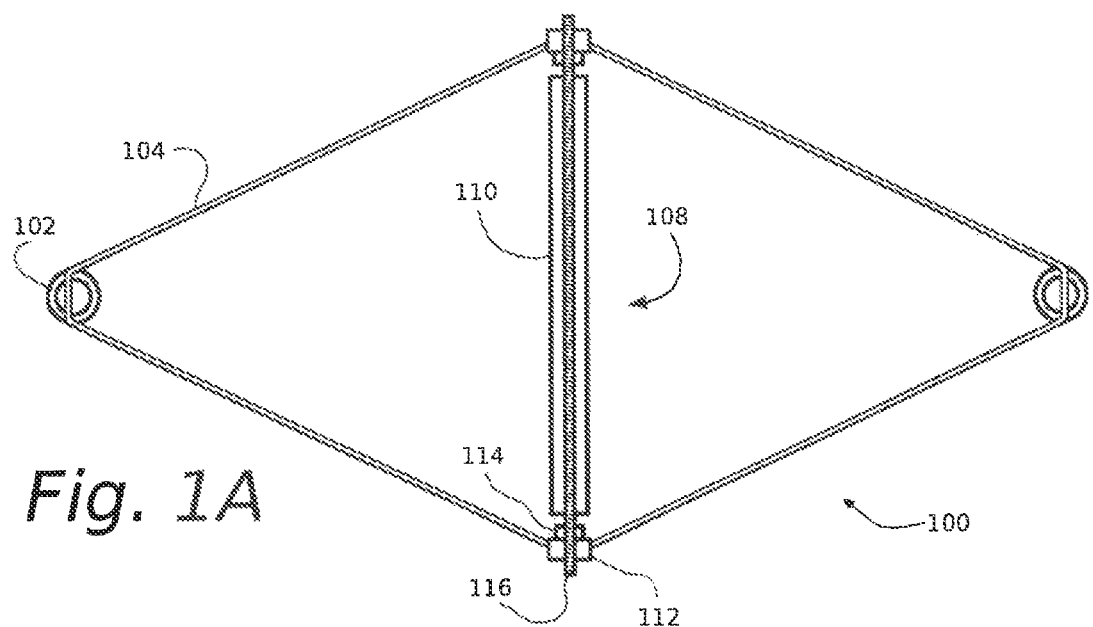
FIG. 1A is a sectional view of a tensioned support ring.
Figure 1B:
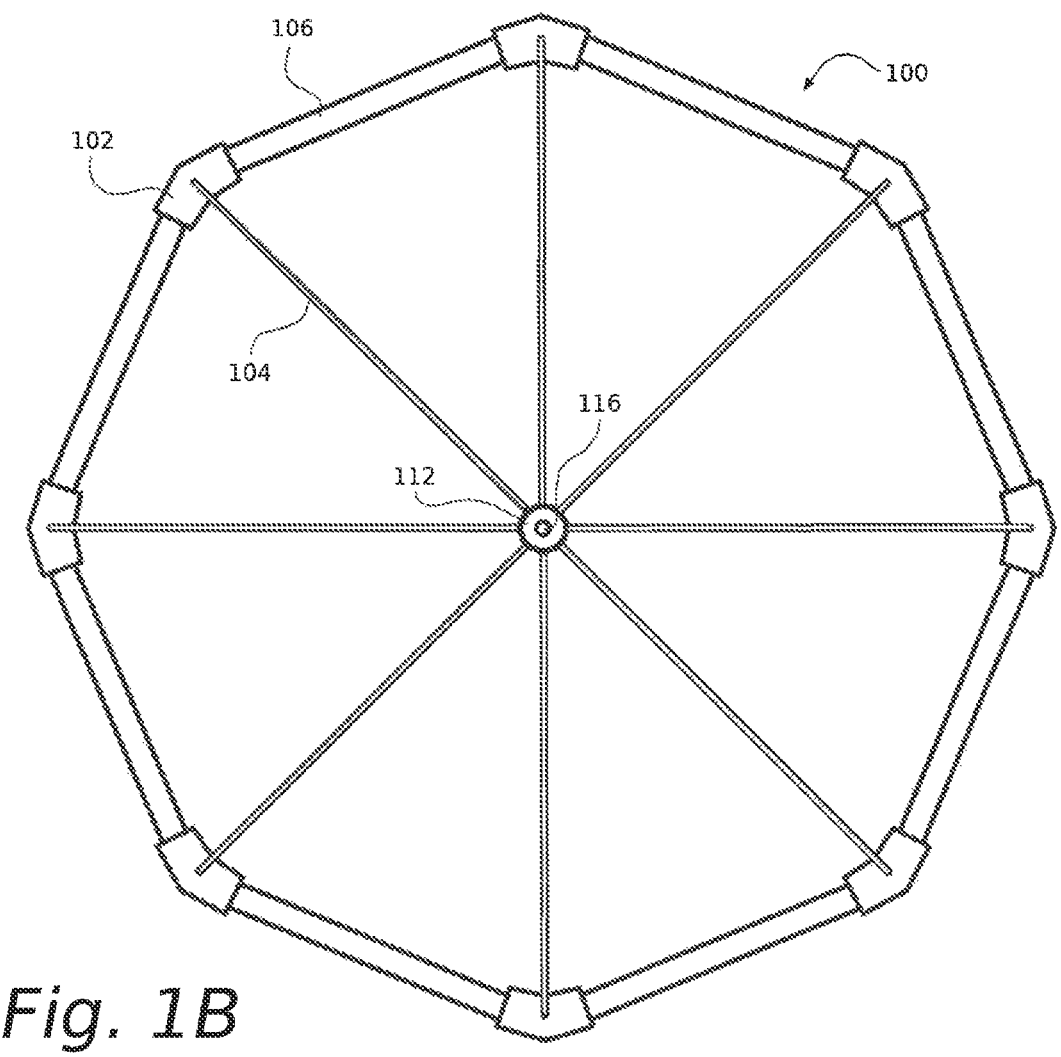
FIG. 1B is a plan view of the same tensioned support ring shown in FIG. 1A.

One embodiment of the support ring 100 is shown in FIG. 1A (side view) and FIG. 1B (top view). When assembled, this support ring takes the form of a regular polygon in the sense that it has equal sides and equal angles. In this case, there are 8 long skinny tubes or segment bars 106 connected end for end by 8 elbow connectors 102. In this example, there is a single spoke 104 passing through each elbow. The ends of these spokes are connected to the hub plates 112 on either side of the expandable hub assembly 108. In this case, the hub assembly is composed of a stick of threaded rod 116 and a hub expansion nut 114 on either side. These expansion nuts are used to force the hub plates 112 apart from each other creating tension in the spokes. A support ring of this nature can be brought to a high level of tension thereby creating great stability, right up to the point where a spoke breaks or a segment bar bends. Due to the natural stability, very small and lightweight components can be assembled in to a very large and stable support ring.

In this case, there are 8 segments, but as a general rule, the more segments there are, the lighter the support ring can be made while maintaining a similar strength. For example, a ring with 100 segments could be so large and lightly constructed that it would practically disappear in the distance.

Figure 2A:
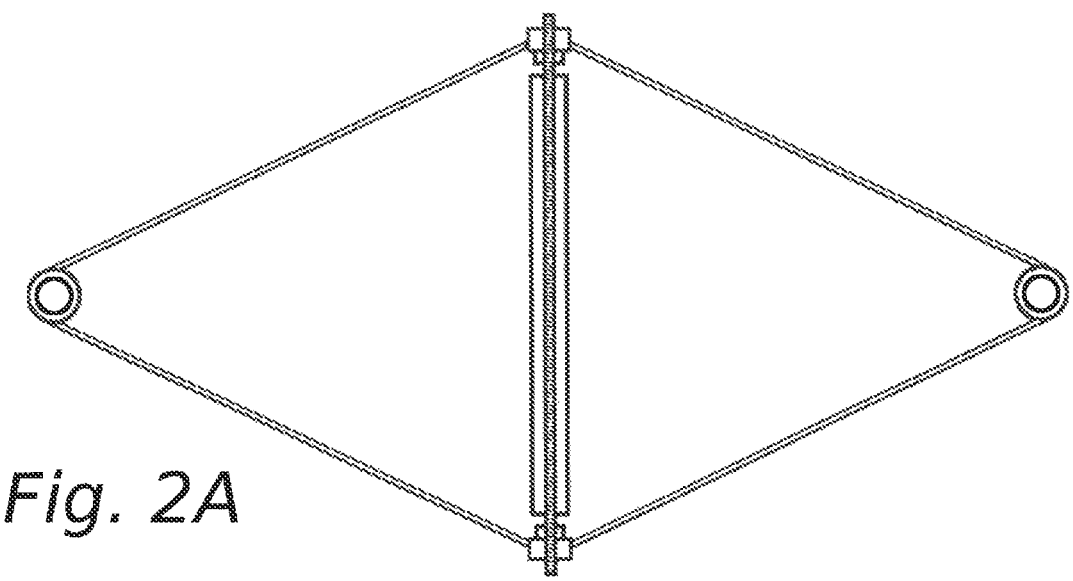
FIG. 2A is a sectional view of a tensioned support ring with spokes that do not pass through the elbows as they do in FIG. 1A and FIG. 1B.
Figure 2B:
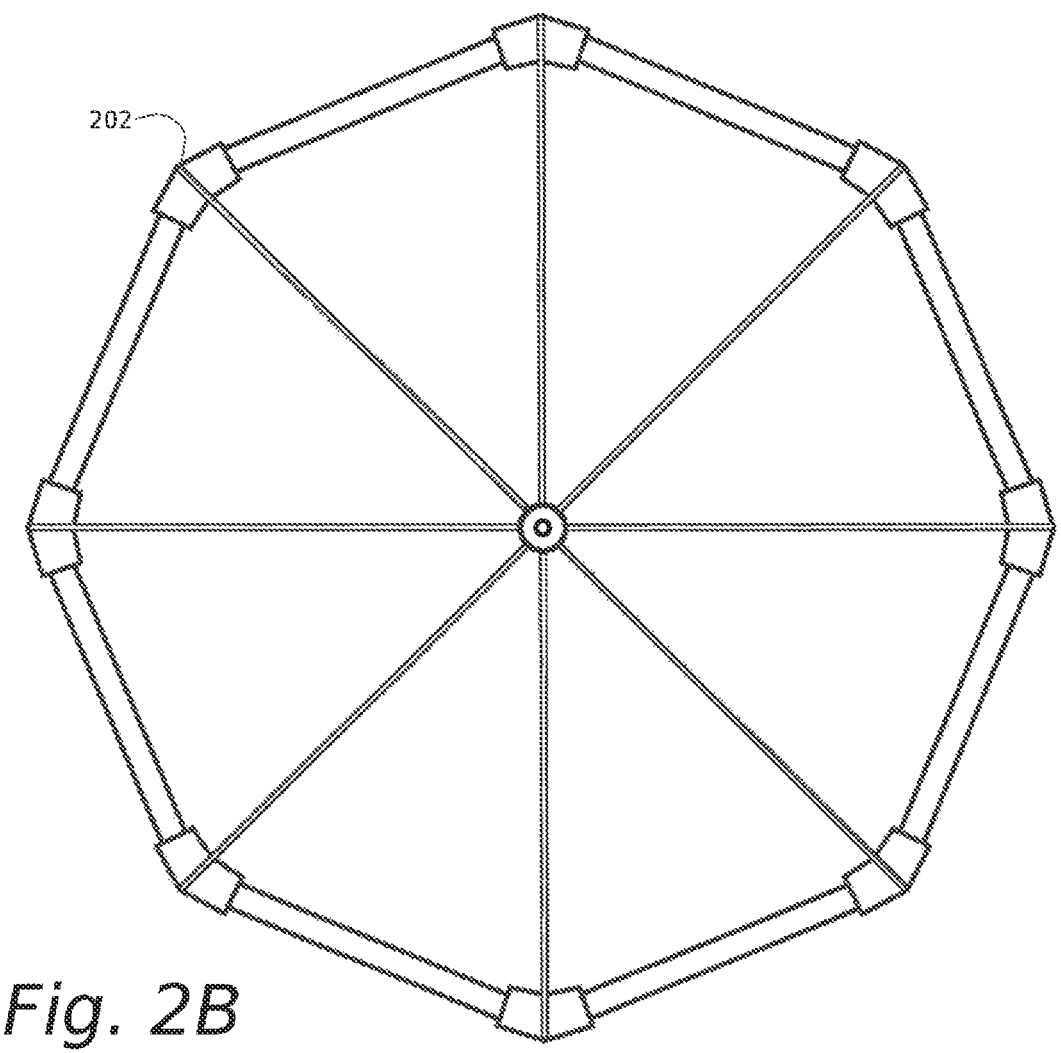
FIG. 2B is a plan view of the same tensioned support ring shown in FIG. 2A.
Figure 3:
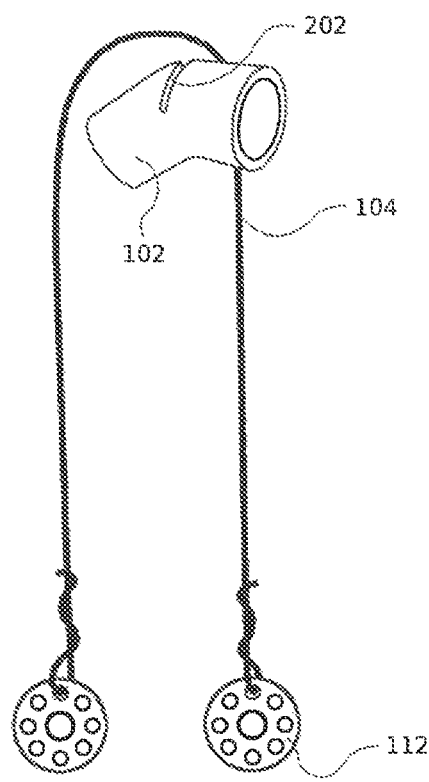
FIG. 3 is a perspective view of some of the tensioned ring parts including an elbow, a spoke wire, and two hub plates.

A slightly different variation of the tensioned support ring is shown in FIG. 2A and FIG. 2B where each spoke 104 rests in an open groove 202 (FIG. 2B and FIG. 3) on the corner edge of each elbow.

Figure 4:
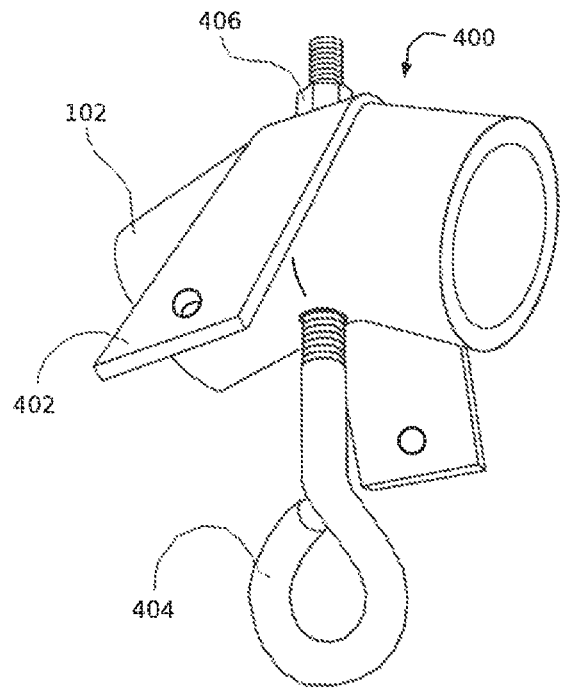
FIG. 4 is a perspective view of an alternative elbow for a tensioned support ring.
Figure 5:
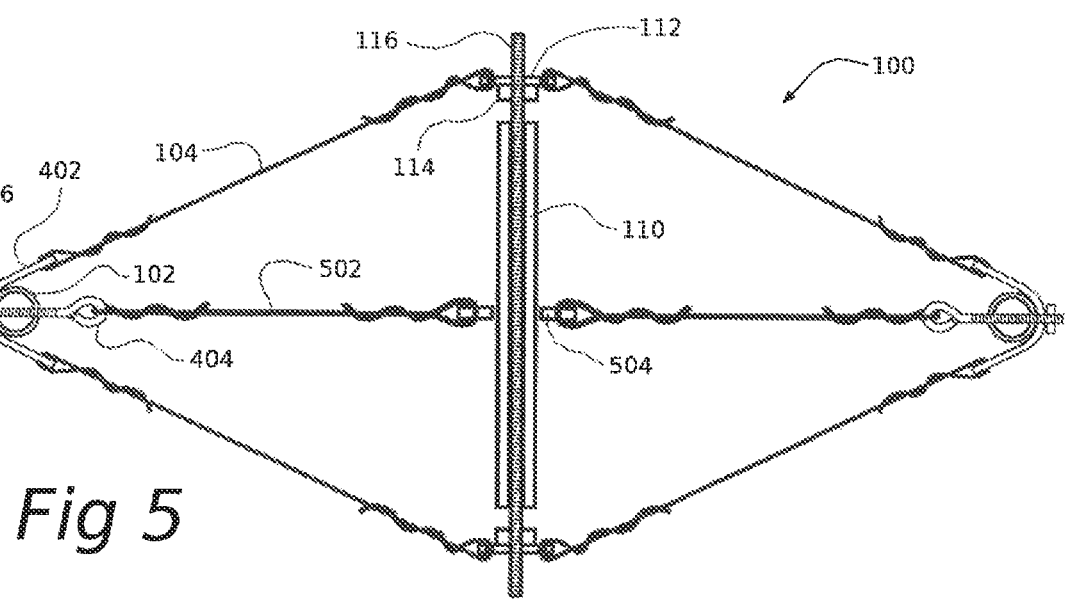
FIG. 5 is a sectional view of a support ring using the elbow of FIG. 4.

Another variation of the tensioned support ring is shown in FIG. 4 where there is a spoke connection plate 402 that provides an attachment point for a spoke on either side of the elbow. Additionally, there is an eye bolt 404 that provides an additional attachment point for an axle stabilizing spoke 502 (FIG. 5) which is connected to an axle positioning plate 504 which helps to keep the center of the axle on perfect center. With the addition of this axle positioning plate, and 3 or more of these stabilizing spokes, a thinner axle is sufficient to create a high level of tension on the spokes.

Figures 6A, 6B:
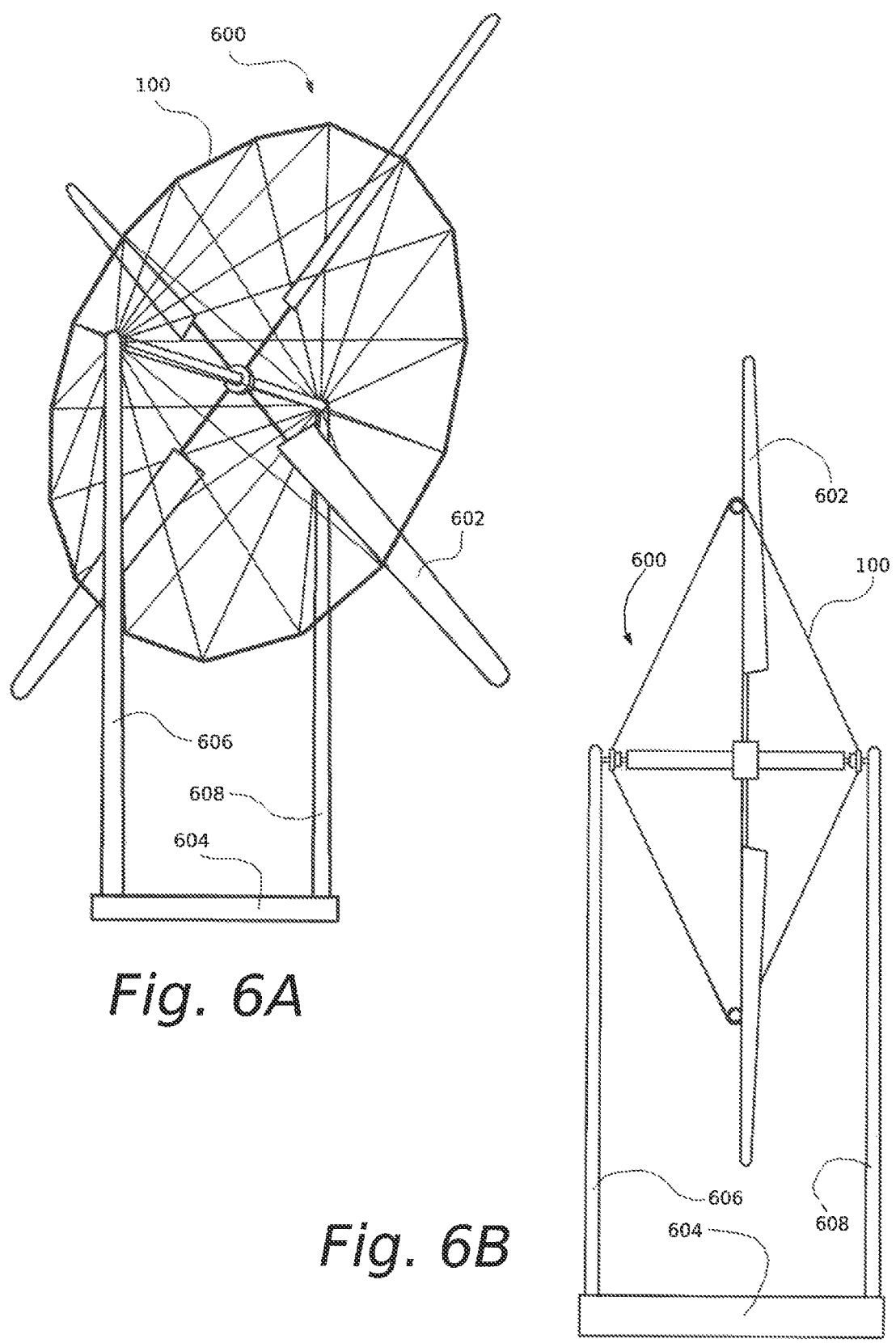
FIG. 6A is a perspective view of a tensioned support ring mounted between two towers with blades attached to create a wind ring type of rotor assembly.
FIG. 6B is the same wind ring type of rotor assembly of FIG. 6A but shown in a sectional view with front and back parts removed for visual clarity.

FIGS. 6A and 6B show the support ring 100 mounted on a common base 604 with two support towers 606 and 608. Blades 602 are attached against the side of the support ring. With this approach, the blades can extend beyond the support ring for an increased sweep area.

Figure 7:
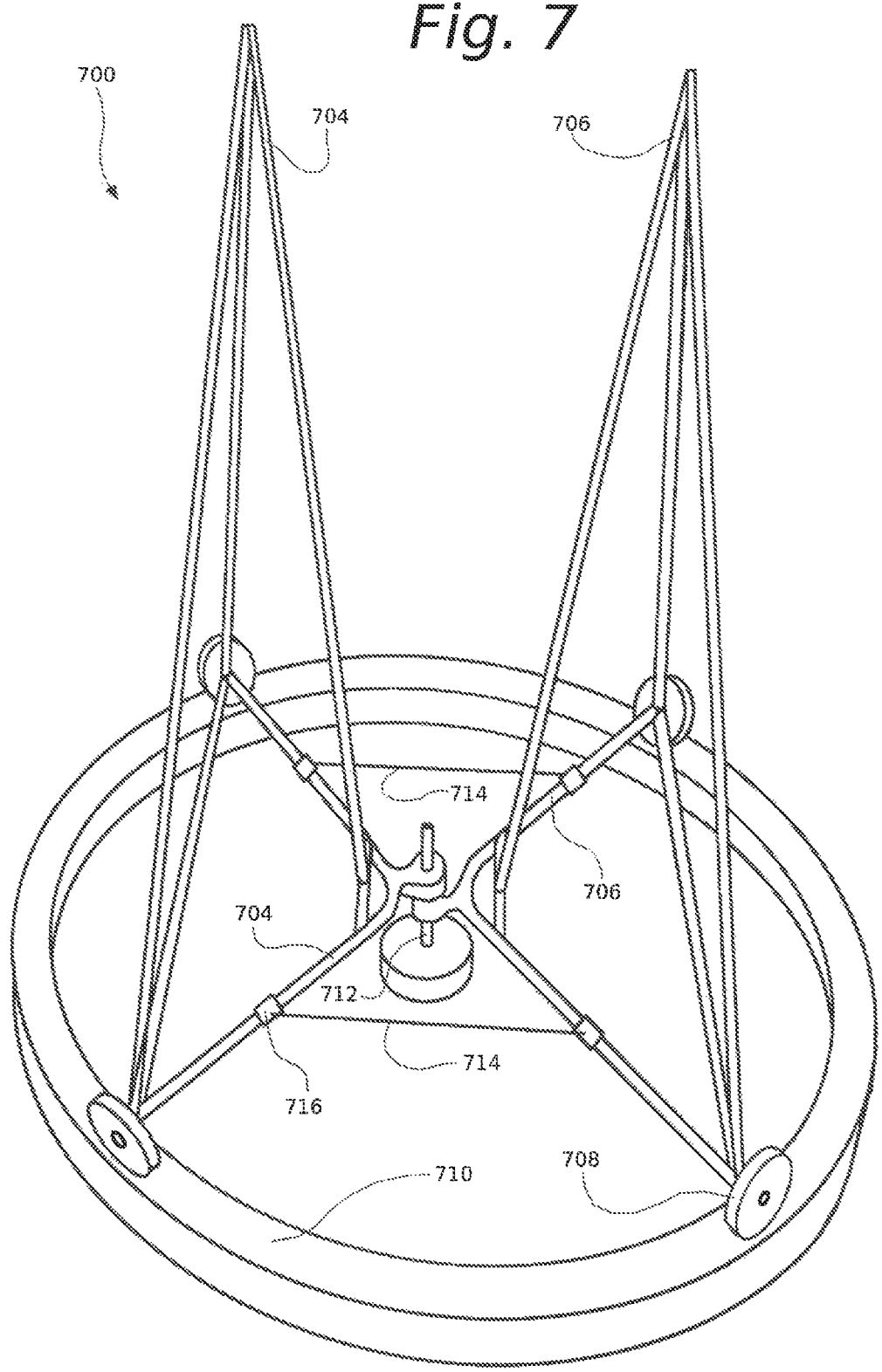
FIG. 7 is a perspective view of a structure designed to hold a wind ring type rotor assembly between two wheeled towers that rotate as one, around a common pin.

FIG. 7 is a material efficient base that is easy to construct and suitable for this support ring. In this case, two towers 704 and 706 maintain a constant spacing as they revolve around a circular track 710. The space is maintained by the rotor (not shown) and the tower connecting cables 714.

Figure 8:
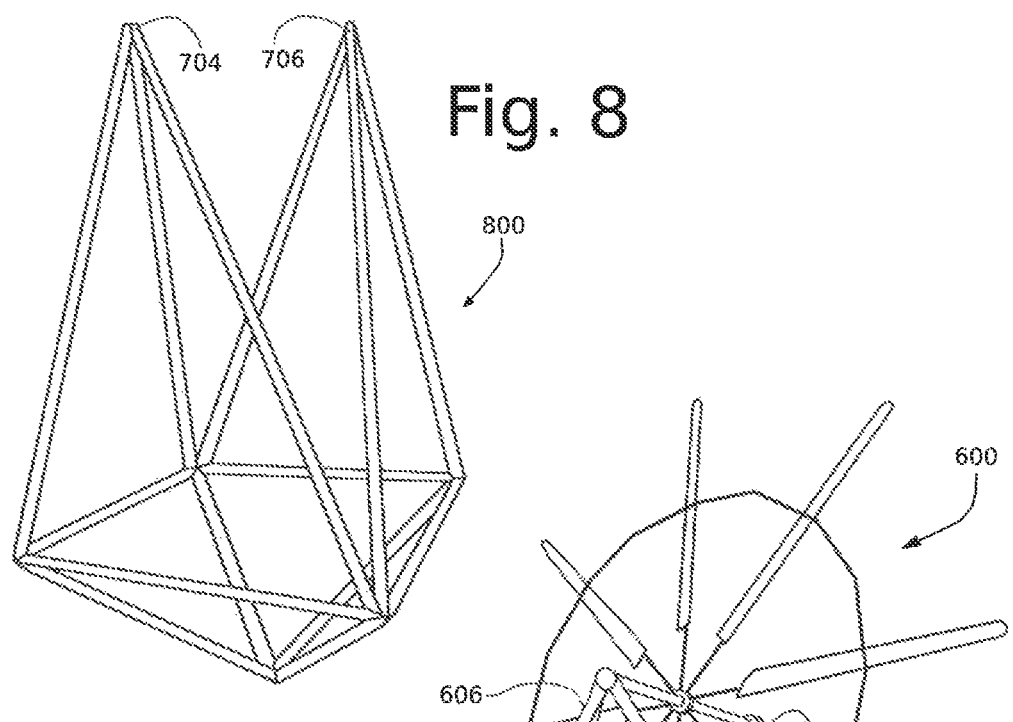
FIG. 8 is a perspective view of a simple and strong double tower frame for a wind ring.
Figure 9:
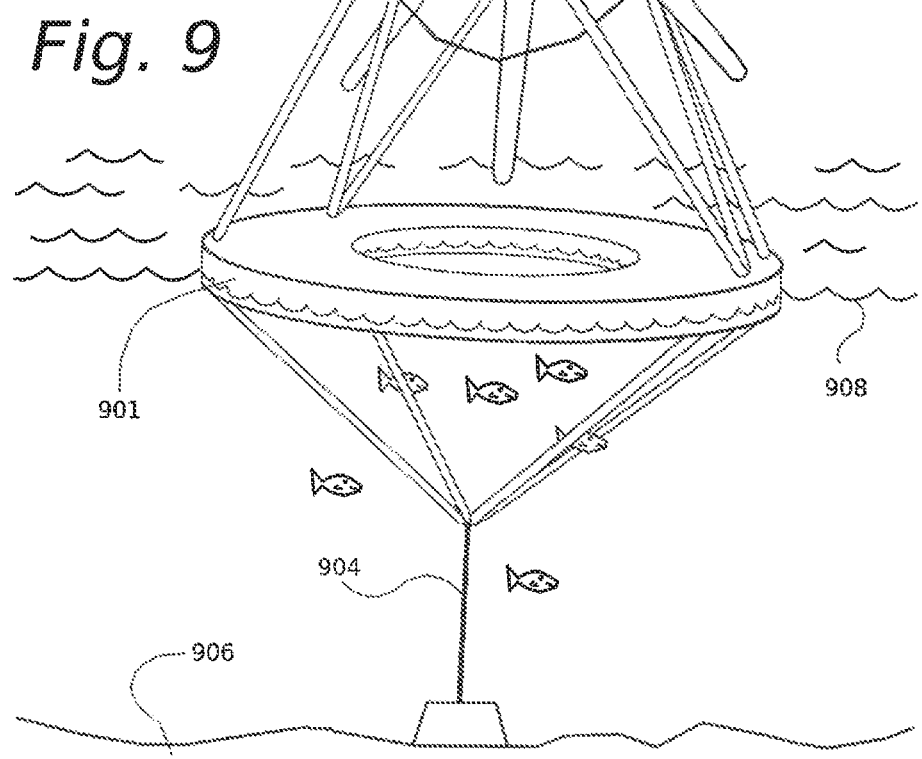
FIG. 9 is a perspective view showing a floating wind ring.

FIG. 8 shows a solid framework 800 that can be used with a wind ring 600 (FIG. 9) by adding some buoyant material 901 to create a floating wind turbine. The idea is to draw it down into the water by it's low point with an anchor line 904 attached to the sea floor 906. Extra buoyancy can be added as a means of creating extra tension on the anchor line which will result in greater stability during rough winds and waves.

Figures 10A, 10B:
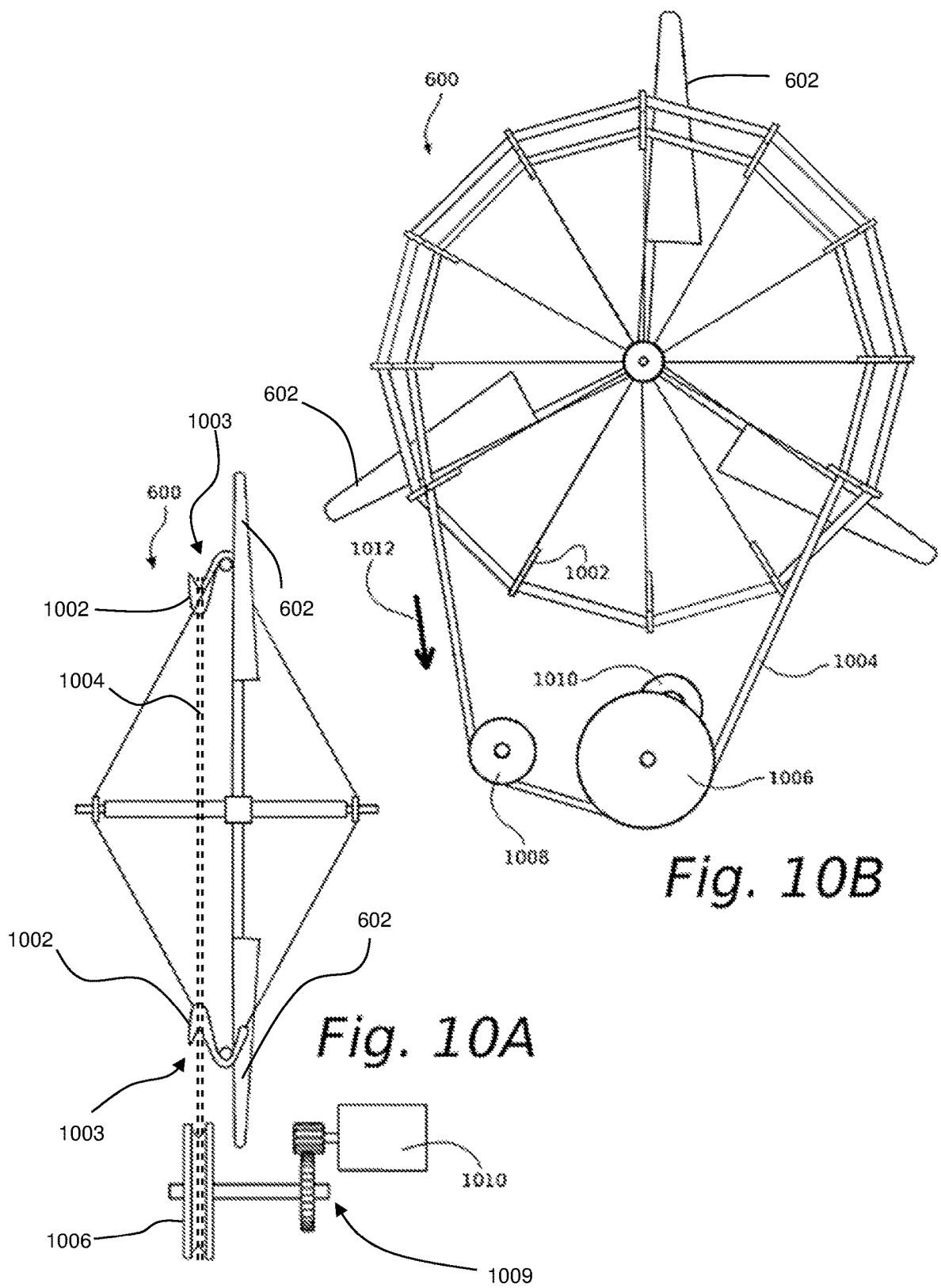
FIG. 10A is a sectional view of a wind ring with hooks attached for the purpose of driving a belt that powers a generator below.
FIG. 10B is an elevation view of the same wind ring in FIG. 10A except there is an added belt and an arrow to indicate the direction of belt travel.

FIG. 10A (side view) and FIG. 10B (front view) show a system for transferring power from the wind ring 600 to a generator 1010 using belt drive hooks 1002, each having a belt engagement hook 1003, as a means of driving a belt 1004 connected to a drive pulley 1006 below. As shown, the blades 602 are attached to the wind ring 600 and a gearing mechanism 1009 mechanically connects the drive pulley 1006 and the generator 1010.

FIG. 11 shows the wind ring 600 being used to generate electricity from water currents 1106. The idea is to use plenty of extra buoyancy in the floating platform 1102 so that it can be drawn down into the water with great force by the guy cables 1104 as a way of achieving the necessary stability.

FIGS. 12A and 12B show how the tensioned support ring can be used with a rope drive system. In this case, the spliced rope 1202 is making two trips around the rotor for added slip resistance. Also, the rope making two trips around the generator pulleys 1208 but additional trips can be added to improve traction, as was a normal practice when rope drives were common.

Figure 13A:
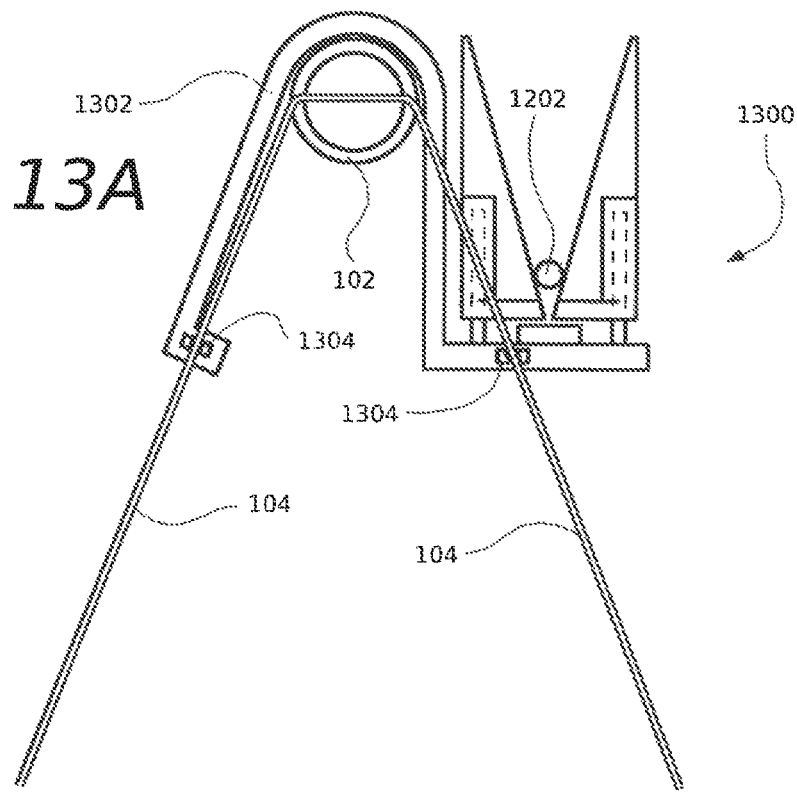
FIG. 13A is a sectional view of a tensioned support ring elbow with an attached fast entry cam cleat which serves as a method of preventing a spliced rope from slipping.
Figure 13B:
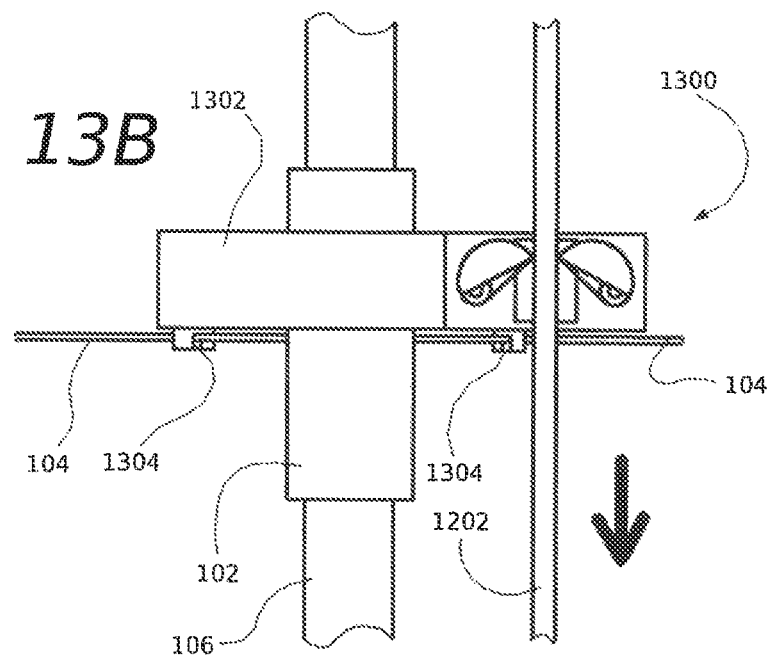
FIG. 13B is a plan view of the fast entry cam cleat and other parts shown in FIG. 13A

FIGS. 13A (side view) and 13B (top view) show a fast entry cam cleat 1300 as an alternative method of improving slip resistance. The idea is to use regular belt hooks 1002 (FIG. 10A) plus two or more of these fast entry cam cleats. In this case, the cam cleat base 1302 can be lightly attached to the spokes 104 because the shape of the cleat base plus the spoke grooves molded into it's body 1304 tend to hold the fast entry cam cleat in position.

Figure 14A:
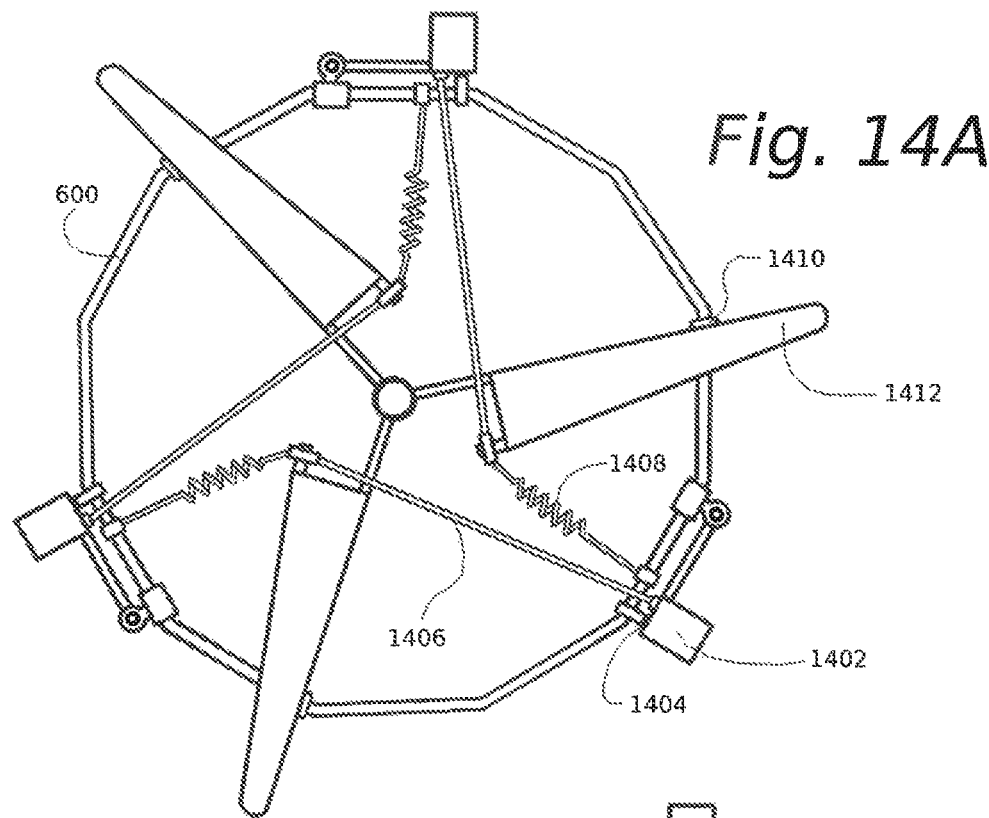
FIG. 14A is an elevation view of a tensioned ring with a centrifugal governor system to prevent over speed conditions. The spokes are removed for visual clarity.
Figure 14B:
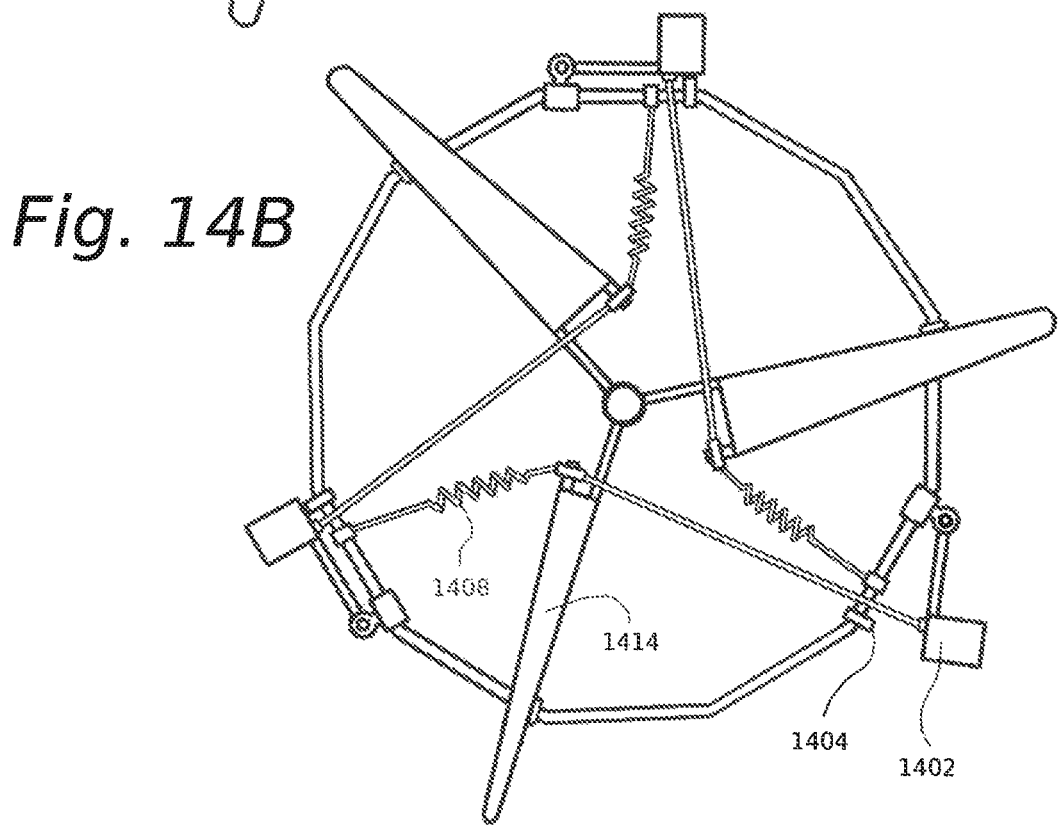
FIG. 14B is the same view of the tensioned ring in FIG. 14B with the exception of one blade, which is now shown in a feathered position.

FIGS. 14A and 14B (rear views) show a rotor with speed limiting governor 1400. Under normal operation, a steady load and moderate winds can keep the rotor spinning at the correct speed. But if the load circuit is cut, or the winds become overpowering, a rotor with efficient blades can quickly spin out of control and potentially fly to pieces.

In this system, there are three centrifugal weights 1402 held against the wind ring 600 by an adjustable strength catch 1404 such as a permanent magnet with a distancing screw to lessen the grip as desired. In the case of an over-speed condition the lightest attached centrifugal weight breaks free pulling a feathering cable 1406 which pulls a blade against it's power return spring 1408 causing the blade to pitch into a lightly feathered position 1414 which tends to slow down the rotor to a point where the spring can draw the weight back against it's catch.

But in a heavy wind or loss of load, this might not be enough to stay with in the desired speeds. In this case, a second centrifugal weight breaks free and it's blade pitches into a medium feathered position.

But in a hurricane force wind, this might not be enough in which case the third blade pitches into a full feathered position and stays there until the speed has slowed enough to reset.

FIGS. 15A, 15B, and 15C show a motorized pitch control system. It's a simpler system than the usual approach in the sense that it only needs one motor 1516 (FIG. 15B) and that motor only needs to be powered in one direction.

During normal operation, a computer can cause the blades to pitch into a more feathered position as shown in FIG. 15C by sending power to a lock release solenoid 1520, thereby releasing motor lock 1518. In this way, the feathering springs 1507 of all three blades are able to pull the power cables 1504 which will turn the power spool 1506 which will drive the motor backwards allowing the blades to gradually feather as shown in FIG. 15C. When the computer wants to stop the blades, it cuts power to the lock release solenoid thereby allowing the lock to spring back into the set position.

If the computer wants the blades to catch more wind, it powers the lock release solenoid while simultaneously powering the motor causing the blades to start pitching flatter to the wind. Once the desired blade pitch is reached, the computer cuts power to the motor and simultaneously cuts power to the motor lock.

Under normal conditions, the computer would keep control of the blades. But if that fails, there is also a back up system to feather the blades. When an over-speed condition occurs, the centrifugal weight 1510, held by an adjustable strength catch 1404, breaks free. This causes the trip wire 1508 to release the motor lock 1518 which allows the blades to pitch into a fully feathered position 1414 as shown in FIG. 15C.

I claim:
1. A system of getting power from a wind ring, the system comprising:
   a wind ring formed from:

a plurality of rigid tube segments of equal length;
elbow fittings joined with the rigid tube segments; and
spokes connected between the elbow fittings, wherein the spokes are connected to an axle having an expandable hub assembly, wherein the axle is positioned inside the wind ring in a central location and wherein the axle is positioned perpendicular to a plane of the wind ring;
a plurality of blades connected to the axle and extending outwards therefrom;
a belt connected to the wind ring at a position radially interior of the plurality of rigid tube segments and elbow fittings forming the wind ring,
wherein the belt is connected to the wind ring with a plurality of belt drive hooks, the plurality of belt drive hooks positioned substantially equidistantly around a circumference of the wind ring,
each of the plurality of belt drive hooks being connected to one of the elbow fittings and extending radially inwards of the wind ring in a direction towards the axle, wherein a terminating end of the each of the plurality of belt drive hooks has a belt-engagement hook for engaging a portion of the belt in a position offset from the plurality of rigid tube segments and the elbow fittings;
at least one pulley connected to the belt; and
at least one generator driven by the belt via the at least one pulley, wherein rotational movement of the wind ring is transferred to the at least one generator through the belt and the at least one pulley.

2. The system of claim 1, wherein the plurality of blades is positioned at least partially interior of the wind ring and at least partially exterior of the wind ring.

3. The system of claim 1, further comprising a gearing mechanism mechanically connecting the at least one pulley and the at least one generator.

4. The system of claim 1, further comprising at least one belt tensioner pulley connected to the belt.

* * * * *